March 1, 1949.                  C. H. MORROW                    2,462,886
                            WATER TREATING DEVICE
                              Filed May 14, 1945
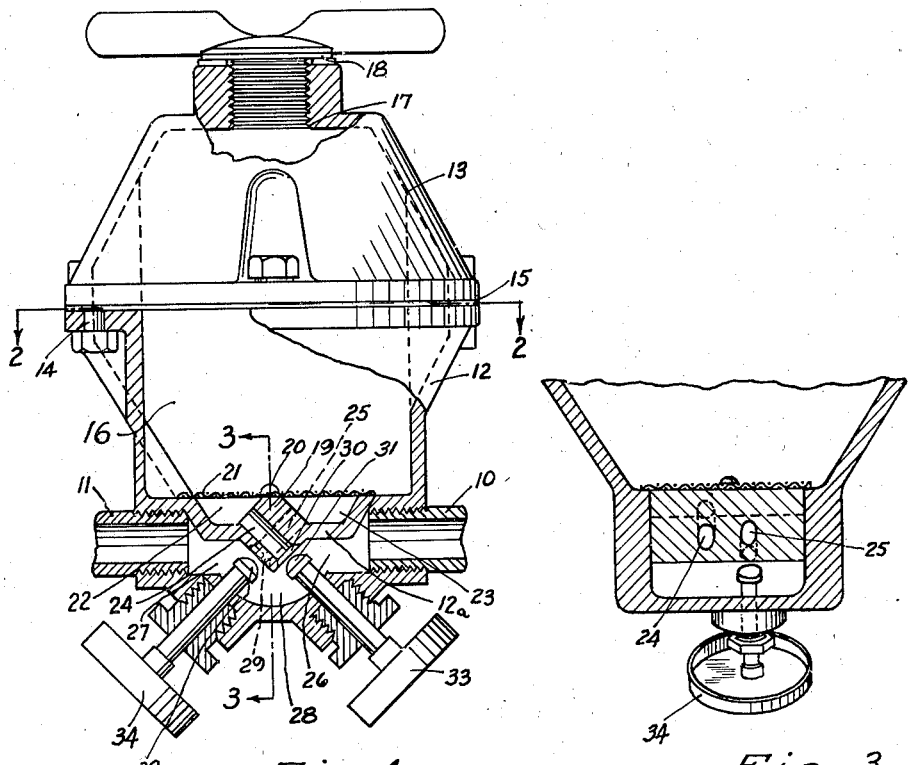
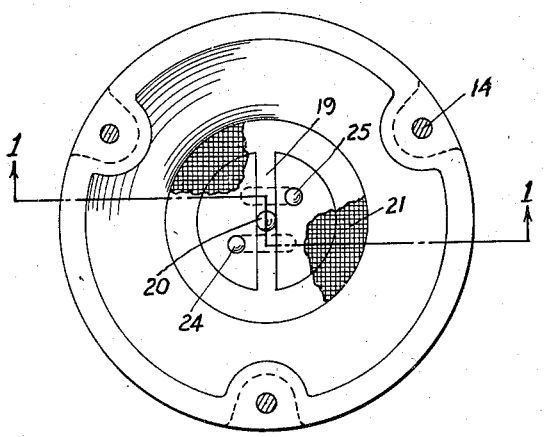
INVENTOR.
CLARENCE H. MORROW
BY
Hyde and Meyer
ATT'YS.

Patented Mar. 1, 1949

2,462,886

UNITED STATES PATENT OFFICE 2,462,886

WATER TREATING DEVICE

Clarence H. Morrow, Shaker Heights, Ohio, assignor to The Hotstream Heater Company, Cleveland, Ohio, a corporation of Ohio Application May 14, 1945, Serial No. 593,572

9 Claims. (Cl. 210—36)

This invention relates to water treating devices, such as are used for conditioning or softening water used for any purpose, such as for a steam boiler, a heating boiler, an industrial or domestic washing machine, or for general industrial or home use. The invention has more particular relation to that class of devices consisting of a receptacle capable of being connected in the water distribution system and of holding a charge of solid treating agent in granular, crystalline or other suitable form with which some of the water is mingled to form a dilute treating solution to be mixed with the water of the system, all for the purposes of inhibiting or preventing the deposition of calcium or magnesium compounds or the formation of rust, or for general water softening purposes.

One object of the invention is to provide an improved device of this kind which readily may be installed in the system, which is easy to operate, which has sufficient capacity for a long period of operation, and which provides or produces proper action of the treating solution to cause it to mingle with and properly treat the water flowing in the distribution system.

A further object is to provide an improved device of this kind in which the motion, or the effect of the motion, of the water flowing in the distribution system is taken advantage of and employed for the purpose of mixing the treating solution with the water to be treated.

Still another object is to provide the necessary means for causing the flowing water to produce turbulence in and around the solid material in the trapped treating chamber, to cause it to mix with and dissolve in the water to be treated.

Another object is to provide an improved device of this kind employing separate pressure and suction channels providing communication between the water distribution system and the trapped chamber containing the treating agent, together with valve means controlling flow through said channels for the purpose of either shutting off all flow, as when replenishing the supply of treating agent, or of causing or permitting regulated flow to control the rate of admission of the treating solution to the system.

Further objects of the invention in part are obvious and in part will appear more in detail hereinafter.

In the drawings, which represent one suitable embodiment of the invention,

Fig. 1 is a front elevation, partly broken out and in section on the line 1—1, Fig. 2.

Fig. 2 is a sectional plan view on the line 2—2, Fig. 1; and

Fig. 3 is a detail sectional elevation on the line 3—3, Fig. 1.

While the invention may be employed for treating water intended for any use, such as those described, it has been illustrated, for convenience only and in no sense of limitation, in a form adapted for use in the treatment of water supplied to an ordinary dwelling house. If placed in the line where the water supply enters the basement, all water used, both hot and cold, will be treated, while either one alone, hot or cold, may be treated by inserting the device in the appropriate branch line, as will be readily understood.

Although any treating agent may be employed, the device shown may be assumed to be used to contain solid water conditioning agents, such as certain of the phosphates, or metaphosphates, in crystalline or granular form. These dissolve rather slowly, with some tendency to gel, but the addition of a very small portion of a solution thereof to the water flowing in the distribution system inhibits or prevents the deposition of calcium or magnesium compounds and the formation of rust, thus tending to prevent clogging or corrosion of the pipes or conduits.

In the drawings, 10, 11, represent respectively a water supply pipe connected to a source (not shown) and a discharge pipe forming part of the distribution system for conducting the water to the various places of use. In the line formed by said pipes is inserted the water treating device of the present invention. This consists of a hollow chambered casing having a generally cup-shaped base or bottom member 12 and an inverted cup-shaped upper or top member 13 joined at the horizontal parting plane by securing bolts 14 which tightly clamp the two members together on the sealing gasket 15 between them, and thus providing an inner chamber 16 for holding or containing the solid treating material.

The upper member 13 has a filling opening 17 sealed closed by a removable screw cap or closure 18.

The casing as a whole may be of any shape in plan view, such as square, hexagonal or round and may be assumed to be round. Bottom member 12 is provided with a floor 12a having an upwardly extending diametrical cross rib 19 to which is attached, as by screw 20, a flat screen 21 resting at its edges on a circumferentially extending ledge or shoulder. This screen serves as a support for the solid treating material, preventing it from dropping away, but permits free flow of water. It also provides two shallow semicircular chambers 22, 23, beneath it which communicate respectively, by way of passages 24, 25, with the supply passage 26 coming from pipe 10, and the discharge passage 27 leading to the discharge pipe 11, it being understood that passages 26, 27, communicate directly with each other and form part of the same general flow chamber 28.

Passages 24, 25 extend through the rib 19 and the floor or cross wall 12a and through a depending rib 29. They lie at right angles to each other and present open mouths extending directly across the passages 26, 27 and surrounded by valve seats 30, cooperating with two valves 31, 32 operated by handles 33, 34.

The device is used as follows:

Let us assume that with the valves 31, 32 closed the device is installed in the service pipe leading to the water distribution system of an ordinary home, and that the water supply is turned on. Closure cap 18 is removed and a charge of treating agent, preferably solid and of crystalline or granular form, is poured into the chamber 16. This chamber may be filled wholly or partially, as desired. The screen 21 prevents the solid material from dropping into chambers 22, 23. Now the closure cap is restored to place and screwed down tight and the two valves 31, 32 are opened partially or wholly, as desired. Water therefore rises in chamber 16 to a level depending upon the head or pressure of the water supply, with due consideration for atmospheric pressure. For example, the chamber 16 may be filled up to the level of the parting plane between the upper and lower casing members, or even more than that.

Solution of the treating agent in chamber 16, by water that has risen into said chamber goes on all the time, but relatively slowly with most treating agents of the kind here employed. When no water is flowing in the distribution system, nevertheless some of the treating material in solution may enter said system as the result of diffusion or migration of the salts by the process of solution. But, whenever water commences to flow, as by turning on a faucet in the distribution system, the pressure at the valve openings is slightly reduced and the level of liquid in the chamber falls. Thus, a portion of the solution is immediately introduced into the flowing stream. When the faucet is closed and flow stops, the level again rises in chamber 16, moving into said chamber additional water adapted to dissolve more of the treating agent. Thus, in this way, the mere starting and stopping of flow in the system produces a pumping effect, as it were, slowly transferring dissolved treating agent from the trapped chamber to the flowing stream.

According to the present invention, however, means is provided for causing actual flow of water into chamber 16 and out of said chamber, the circulation and turbulence thus produced not only positively transferring a portion of the solution into the flowing stream, but also producing agitation of the treating agent and preventing it from gelling or becoming a solid mass impenetrable by the dissolving water. This effect is the result of the arrangement of the passages 24, 25. The opening to passage 24 is presented upstream at an angle of 45° and the passage 25 downstream at a similar angle, and the mouths or openings to said passages extend directly across the flowing stream in both cases. Consequently, when water is flowing in the distribution system there is a pressure effect at the mouth of passage 24 and a suction effect at the mouth of passage 25. Accordingly, whenever water flows in the system, some water flows upwardly through passage 24 into the chamber 22 with which it communicates, thence upwardly through the screen into chamber 16, over or around the treating agent therein, then down through the screen and into chamber 23, and out through channel 25 to the stream of flowing water, which it joins. Thus flow or circulation and agitation go on at all times when water is flowing in the distribution system and to a large extent are responsible for the gradual transfer of the treating agent in small quantities to the water undergoing treatment.

In this device no dependence need be placed upon an air space above the liquid in chamber 16 for causing transfer of the solution to the flowing water stream. In other words with cover 18 removed the chamber 16 may be entirely filled with the solid treating agent and one of the two valves may be opened slightly to permit the chamber to become entirely filled with water, after which the cover is replaced. Now, with both valves open, more or less as desired, water circulation into and out of chamber 16 occurs whenever water flows in the system, continually supplying treating agent to the stream so long as the flow continues.

Valves 31, 32 supply a means of regulating, to some extent, the rate of admission of the treating solution to the system, by the possibility of more or less opening said valves and thus controlling the rate of circulation into and out of chamber 16, as will be readily apparent.

Other advantages of the invention will be apparent to those skilled in the art.

What I claim is:

1. A device of the character described, comprising a casing, a cross wall in said casing to thereby provide the casing with upper and lower chambers, the lower chamber being a flow chamber having inlet and outlet portions for connection to conduits of a water distribution system, a transverse screen in said upper chamber to thereby provide above said screen a reservoir for a water treating agent, partition means between said screen and said cross wall to thereby provide between said screen and said cross wall, on opposite sides of said partition means, two non-communicating compartments, and means for establishing communication between said compartments and said flow chamber, there being one passageway establishing communication between one of said compartments and the inlet portion of said flow chamber and another passageway, free of communication with said first mentioned passageway, establishing communication between the other of said compartments and the outlet portion of said flow chamber.

2. A device of the character described, comprising a casing, a cross wall in said casing to thereby provide the casing with upper and lower chambers, the lower chamber being a flow chamber having inlet and outlet portions for connection to conduits of a water distribution system, a transverse screen in said upper chamber to thereby provide above said screen a reservoir for a water treating agent partition means between said screen and said cross wall to thereby provide between said screen and said cross wall, on opposite sides of said partition means, two non-communicating compartments, a pair of non-communicating passageways through said cross wall, one passageway establishing communication between one of said compartments and the inlet portion of said flow chamber and the other passageway establishing communication between the other of said compartments and the outlet portion of said flow chamber, and a valve for controlling the flow through each of said passageways.

3. A device of the character described, comprising a casing, a cross wall in said casing to thereby provide the casing with upper and lower chambers, the lower chamber being a flow chamber having inlet and outlet portions for connection to conduits of a water distribution system, a transverse screen in said upper chamber to thereby provide above said screen a reservoir for a water treating agent, partition means between said screen and said cross wall to thereby provide between said screen and said cross wall, on opposite sides of said partition means, two non-communicating compartments, and a pair of non-communicating passageways through said cross wall and arranged at right angles to each other, one passageway establishing communication between one of said compartments and the inlet portion of said flow chamber and the other passageway establishing communication between the other of said compartments and the outlet portion of said flow chamber.

4. A device of the character described, comprising a casing, a cross wall in said casing to thereby provide the casing with upper and lower chambers, the lower chamber being a flow chamber having inlet and outlet portions for connection to conduits of a water distribution system, a transverse screen in said upper chamber to thereby provide above said screen a reservoir for a water treating agent, partition means between said screen and said cross wall to thereby provide between said screen and said cross wall, on opposite sides of said partition means, two non-communicating compartments, a pair of non-communicating passageways through said cross wall and arranged at right angles to each other, one passageway establishing communication between one of said compartments and the inlet portion of said flow chamber and the other passageway establishing communication between the other of said compartments and the outlet portion of said flow chamber, and an adjustable valve for each of said passageways.

5. A device of the character described, comprising a casing, a cross wall in said casing to thereby provide the casing with upper and lower chambers, the lower chamber being a flow chamber having inlet and outlet portions for connection to conduits of a water distribution system, a transverse screen in said upper chamber to thereby provide above said screen a reservoir for a water treating agent, partition means between said screen and said cross wall to thereby provide between said screen and said cross wall, on opposite sides of said partition means, two non-communicating compartments, a pair of non-communicating passageways through said cross wall, one passageway being upwardly inclined from the inlet portion of said flow chamber and leading to one of said compartments and the other passageway being downwardly inclined from the other of said compartments and leading to the outlet portion of said flow chamber.

6. A device of the character described, comprising a casing, a cross wall in said casing to thereby provide the casing with upper and lower chambers, the lower chamber being a flow chamber having inlet and outlet portions for connection to conduits of a water distribution system, a transverse screen in said upper chamber to thereby provide above said screen a reservoir for a water treating agent, partition means between said screen and said cross wall to thereby provide between said screen and said cross wall, on opposite sides of said partition means, two non-communicating compartments, a pair of non-communicating passageways through said cross wall, one passageway being upwardly inclined from the inlet portion of said flow chamber and leading to one of said compartments and the other passageway being downwardly inclined from the other of said compartments and leading to the outlet portion of said flow chamber, and a pair of valves in said flow chamber, one for controlling the flow through each of said passageways.

7. A device of the character described, comprising a casing, a cross wall in said casing to thereby provide the casing with upper and lower chambers, the lower chamber being a flow chamber having inlet and outlet portions for connection to conduits of a water distribution system, said cross wall having an upwardly disposed rib extending thereacross in transverse relation to the inlet and outlet portions of said flow chamber and providing a pair of compartments above said flow chamber portions on opposite sides of said rib, a horizontal screen resting upon said cross wall rib and providing a perforated top wall for said compartments, the portion of the upper chamber above said screen constituting a reservoir for a water treating agent, and means for establishing communication between one of said compartments and the inlet portion of said flow chamber and between the other of said compartments and the outlet portion of said flow chamber.

8. A device of the character described, comprising a casing, a cross wall in said casing to thereby provide the casing with upper and lower chambers, the upper chamber being adapted to receive a water treating agent and the lower chamber being an elongated flow chamber having inlet and outlet end portions for connection to conduits of a water distribution system, said cross wall having depending therefrom a V-shaped rib extending substantially normal to the longitudinal axis of the flow chamber, with the side walls of such rib at substantially 45° angles to such axis, and a pair of non-communicating passageways extending through said cross wall, one passageway leading from the inlet portion of the flow chamber to the upper chamber and having its inlet end in one face of the cross wall rib and the other passageway leading from said upper chamber to the outlet portion of the flow chamber and having its outlet end in the other face of the cross wall rib.

9. A device of the character described, comprising a casing, a cross wall in said casing to thereby provide the casing with upper and lower chambers, the upper chamber being adapted to receive a water treating agent and the lower chamber being an elongated flow chamber having inlet and outlet end portions for connection to conduits of a water distribution system, said cross wall having depending therefrom a V-shaped rib extending substantially normal to the longitudinal axis of the flow chamber, with the side walls of such rib at substantially 45° angles to such axis, a pair of non-communicating passageways extending through said cross wall, one passageway leading from the inlet portion of the flow chamber to the upper chamber and having its inlet end in one face of the cross wall rib and the other passageway leading from said upper chamber to the outlet portion of the flow chamber and having its outlet end in the other face of the cross wall rib, and a transverse screen in the upper chamber for the support of the water treating agent.

CLARENCE H. MORROW.

REFERENCES CITED

The following references are of record in the file of this patent:

UNITED STATES PATENTS

| Number | Name | Date |
|---|---|---|
| 412,910 | Blessing | Oct. 15, 1889 |
| 461,235 | Butler | Oct. 13, 1891 |
| 823,941 | Fetta | June 19, 1906 |
| 1,193,038 | Mann | Aug. 1, 1916 |
| 1,216,051 | Bayley | Feb. 13, 1917 |
| 1,335,802 | Stewart | Apr. 6, 1920 |
| 1,409,248 | Sevcik | Mar. 14, 1922 |
| 1,676,134 | Coughlan | July 13, 1928 |

FOREIGN PATENTS

| Number | Country | Date |
|---|---|---|
| 19,378 | Great Britain | 1905 |